United States Patent [19]

Higgins

[11] 4,254,545
[45] Mar. 10, 1981

[54] MANUFACTURE OF DOORS FOR SAFE DEPOSIT BOX NESTS

[75] Inventor: Eldon C. Higgins, Cedar Rapids, Iowa

[73] Assignee: Kidde, Inc., Cedar Rapids, Iowa

[21] Appl. No.: 33,863

[22] Filed: Apr. 27, 1979

[51] Int. Cl.³ .............................................. B23P 13/00
[52] U.S. Cl. ........................................ 29/558; 29/559;
269/49; 269/57
[58] Field of Search ...................... 29/35.5, 564, 564.2, 29/38 C, 558, 559; 408/71; 409/198, 221; 269/47, 57, 63, 49

[56] References Cited

U.S. PATENT DOCUMENTS

| | | | |
|---|---|---|---|
| 2,394,376 | 2/1946 | Grylewicz et al. | 269/49 X |
| 2,804,896 | 9/1957 | Carper | 269/49 X |
| 3,336,823 | 8/1967 | Bonzi | 409/221 X |

Primary Examiner—Francis S. Husar
Assistant Examiner—C. J. Arbes
Attorney, Agent, or Firm—Haven E. Simmons; James C. Nemmers

[57] ABSTRACT

A manufacture of uniformly sized doors for the compartments of safe deposit box nests comprises punching the lock nose holes in uniformly oversized door blanks and then using those holes as the reference from which the various operations on the edges and rear faces of the blanks are performed. For the latter purposes the blanks are supported in a vertical position upon special moving workholders which engage and position the blanks by means of reciprocating draw bars which extend through the nose holes. In cooperation with other apparatus, the draw bars releasably clamp the blanks in position while various machine operations are serially performed on the blanks as the workholders pause at successive tool stations.

3 Claims, 8 Drawing Figures

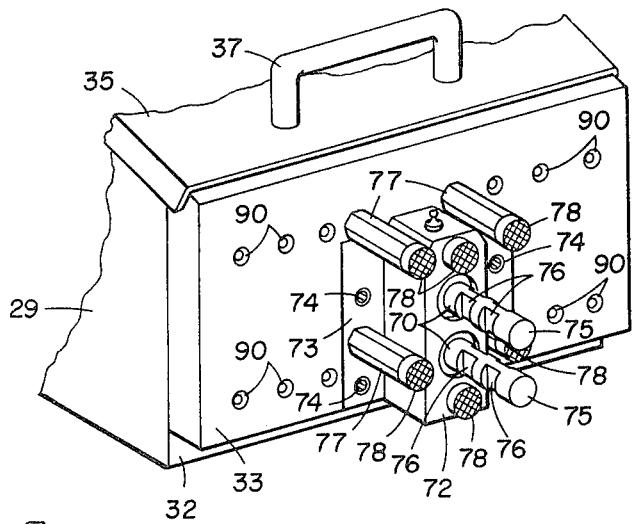
FIG 5
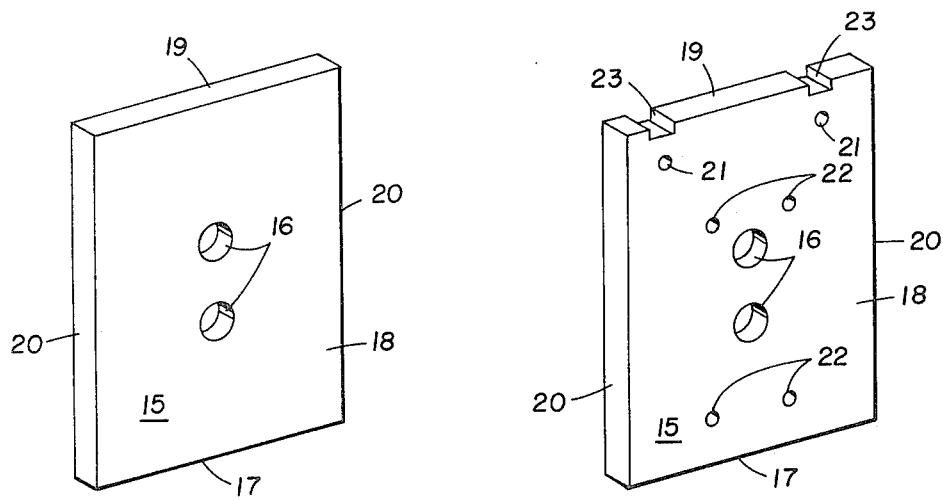
FIG 6
FIG 7
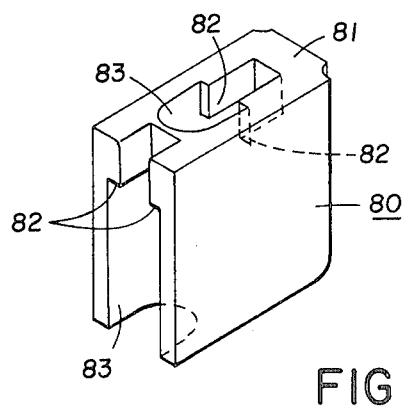
FIG 8

MANUFACTURE OF DOORS FOR SAFE DEPOSIT BOX NESTS

BACKGROUND OF THE INVENTION

The individual compartments of safe deposit box nests are typically closed at their forward ends by doors formed from steel plate. Usually, the doors are manufactured from blanks which are precut slightly oversize and then fitted individually to their respective compartments by hand grinding of their edges. After fitting, the doors are laid in their respective compartment openings and temporarily numbered, which numbers are thereafter permanently stamped into the door outer faces. Subsequently, the lock nose or horn holes are punched, and each door is then placed upon a jig which engages it through its nose holes and holds it in a horizontal position. At one station the lock attaching holes are drilled and tapped. The jig and door are manually transferred to a second station where the hinge mounting holes are drilled. Finally, the door number recesses are painted and the doors polished.

Obviously the foregoing entails a great deal of hand labor and thus cost. Besides that, the doors are not necessarily "square" or uniform in configuration because of the hand grinding of their edges, nor consequently are the nose holes uniformly located since the door edges are used as references when the nose holes are punched. Since the location of the hinge mounting holes are also determined by reference to the door edges, these also tend to be not quite uniformly located, whence the doors must be individually refitted by hand to their respective compartments. The chief object of the present invention is thus both to reduce the amount of hand labor necessary for the manufacture of safe deposit box nest doors and to make the doors as uniform in size and configuration as possible.

SUMMARY OF THE INVENTION

The invention achieves its principal object by a process which enables the doors to be uniformly manufactured in volume on a rotary turntable type of machine using the nose holes of the door blanks as the primary reference from which all other machine operations upon the doors are performed. To this end, the door blanks are uniformly cut slightly oversized and the nose holes punched in them before any other operation upon the blanks is undertaken. The door blanks are then placed one by one upon a number of identical, specially designed workholders on the turntable and rigidly clamped in a vertical position. Supporting the door blanks in a vertical, rather than a horizontal, position allows much easier access to the blanks by the various tools about the turntable. Thereafter, as the turntable rotates the workholders and the door blanks past the various tool stations about the periphery of the machine, the blanks undergo a series of operations from which finished doors (except for numbering and polishing) emerge. Hand labor is thus largely eliminated, volume production achieved, and uniformity of the doors assured.

BRIEF DESCRIPTION OF THE DRAWINGS

FIG. 5 is an isometric view of the front portion of one of the workholders.

FIGS. 6 and 7 are isometric views of a door blank before and after the various operations have been performed upon it by the rotary turntable and its associated tools.

FIG. 8 is an isometric view of one of the clamp blocks for retaining the door blanks upon the workholders.

DETAILED DESCRIPTION OF THE PREFERRED EMBODIMENT

Figure 1:
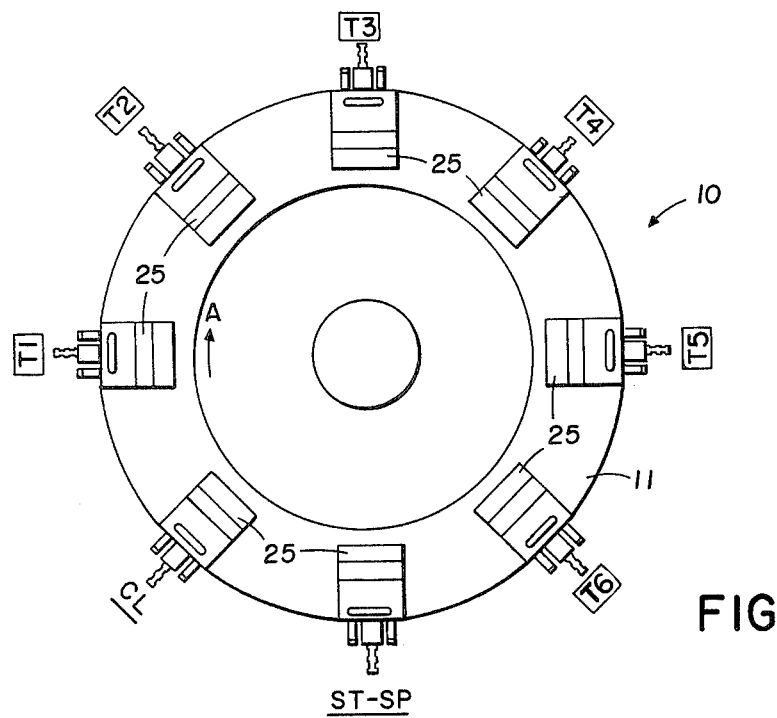
FIG. 1 is a somewhat diagramatic, top plan view of a rotary turntable machine equipped with workholders of the kind employed in the present invention.
Figure 2:
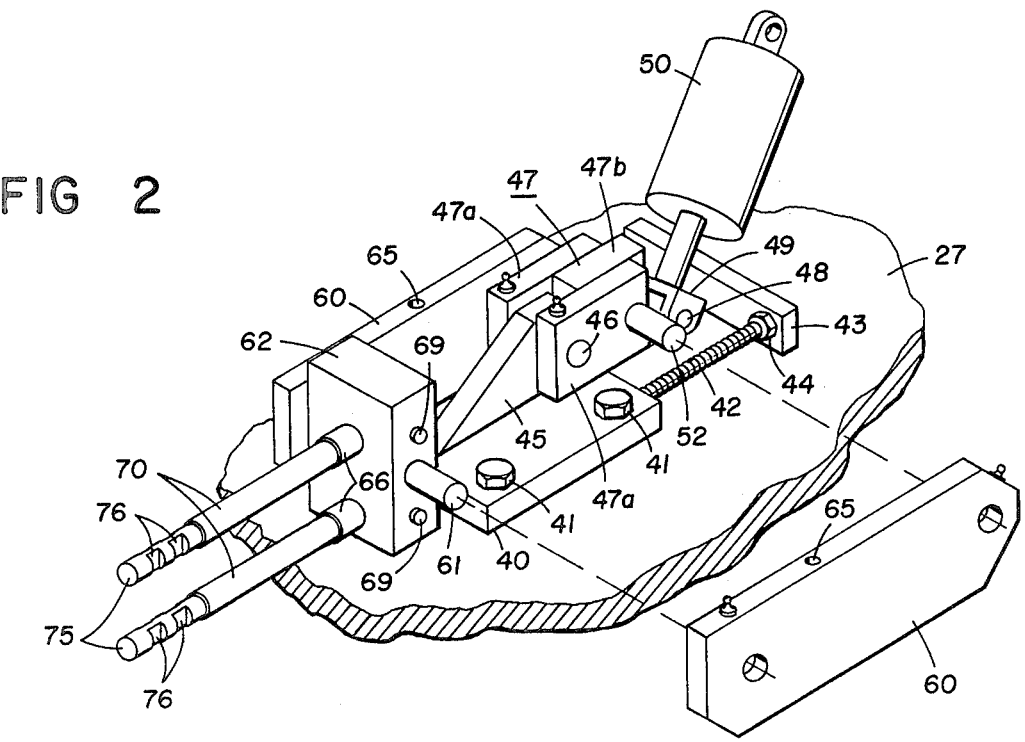
FIG. 2 is an isometric view of the essential working components of the workholders employed in FIG. 1.

The rotary turntable type of machine, generally designated at 10, is well-known in the art and needs little description since it is only incidental to the invention concerned. Basically, the machine consists of an annular table 11 which rotates in the direction indicated by the arrow "A" in FIG. 1 past a number of tool stations indicated at T1-T6 disposed about and outside of the periphery of the table 11. A series of workholders 25, to be later described in more detail and each carrying a door blank 15, are bolted to the table 11 and rotate with it from tool station to tool station, pausing long enough so that the operation at each station can be completed upon the door blanks 15. The door blanks 15 (see FIGS. 6 and 7) are first uniformly cut slightly oversized and punched in a suitable jig to provide uniformly located lock hose holes 16. Each door blank 15 is then manually placed with its strike edge 17 uppermost and its rear face 18 outwardly upon a workholder 25 at the "start-stop" station ST-SP of the turntable 11. At the next station CL the blank 15 is clamped to its workholder 25 in the manner thereafter described. Then at the tool station T1 a 7° bevel is milled on the strike edge 17 and at the station T2 the hinge edge 19 is milled at 90°. A 4° bevel on the upper and lower edges 20 is milled at the station T3 and the hinge mounting holes 21 drilled and tapped at station T4. The lock mounting holes 22 are next drilled and tapped at station T5 and the hinge mounting rabbets 23 milled at station T6. The order in which these operations occur is of no particular moment; some other order could be used just as well. Each finished door 15 is then unclamped at station ST-SP, removed by hand and a new blank 15 put in place. It will be understood, of course, that all the foregoing operations occur more or less simultaneously upon different blanks 15 since each workholder 25 carries a blank 15 undergoing the foregoing sequence of operations. Various pneumatic, hydraulic and electrical components, circuits and the like control the turntable 10, the workholders 25, and the tools at the stations T1-T6. These are well-known in the art, and since they play no direct part in the invention, they need not be further described.

Each workholder 25 (see FIGS. 2-5) comprises an overall, generally rectangular housing 26 comprising a bottom plate 27, bolted at 28 to the turntable 11, and a pair of trapezoidal side plates 29 sloping downwardly from adjacent their rear ends. The latter are closed by a back plate 30 from whose top a partial cover plate 31 extends part-way forwardly and downwardly over the side plates 29. A heavy, transverse plate 32 is secured in the inner corner between the back plate 30 and the partial cover plate 31 for purposes to be described. Across the bottom plate 27 and flush with its forward end and those of the side plates 29 is disposed a low, cross plate 32, and against the forward upper edge of the latter and the forward ends of the side plates 29 is disposed a heavy face plate 33. The face plate 33 is further braced by a pair of spaced, triangular gusset plates 34 between the rear of the face plate 33 and the bottom plate 27. All the foregoing assemblage is secured by appropriate welds. The remainder of the housing 26 is closed by a cover 35 of sheet metal, hinged at 36 across the forward end of the cover plate 31, and provided with a handle 37 for access to the interior of the housing 26.

Within the housing 26 a centrally disposed, rectangular base plate 40 is bolted at 41 adjacent its four corners to the bottom plate 27, the bolt holes in the plate 40 being somewhat elongated fore and aft so that its position can be adjusted relative to the face plate 33. That adjustment is controlled by means of a pair of threaded rods 42 welded into the rear edge of the plate 40 and extending rearwardly and through a transverse bar 43 welded to the bottom plate 27. A pair of nuts 44 on each rod 42 capture the bar 43 and thus afford adjustment of the position of the base plate 40 before its bolts 41 are tightened. A trapezoidal, upright hinge plate 45, running fore and aft of the housing 26, is welded on edge to the base plate 40 and its rear portion provided with a transverse hinge pin 46 extending from each side. On the hinge pin 46 is journaled the forward ends of a bell crank 47, fabricated from a pair of short plates 47a straddling the rear of the hinge plate 45. The plates 47a extend rearwardly of the plate 45 where they sandwich and are welded to the upper end of a vertical plate 47b whose lower rear corner is extended rearwardly and fitted with a transverse hinge pin 48 therethrough. The latter pin 48 engages a clevis 49 at the lower end of the piston rod of a double acting hydraulic cylinder 50 whose upper end is pivoted in a clevis 51 secured beneath the cross plate 32. A pair of short hinge pins 52 are fixed in and extend transversely from the flanks of the crank plates 47a at the rear ends of the latter but forward of and above the hinge pin 48. Hence, when the cylinder 50 is contracted, the bell crank 47 will rotate about the hinge pin 46, whereby the hinge pins 52 will rotate upwardly and forwardly from the position shown in FIG. 4, as indicated by the arrow "B" in that Figure.

To the hinge pins 52 are journaled the rear ends of a pair of parallel link plates 60 which extend forwardly outboard of the bell crank 47, their forward ends being journaled in turn on a pair of hinge pins 61 anchored in the opposite sides of a draw block 62 disposed forward of and above the base plate 40. The link plates 60 are retained on the hinge pins 52 and 61 by a transverse bridge plate 63 through which a pair of hand screws 64 are threaded down into the top edges of the link plates 60 at 65. By removing the hand screws 64, the link plates 60 can be disassembled from the mechanism for purposes to be later described. Fixed in the draw block 62 are a pair of parallel and vertically spaced, forwardly extending cylindrical draw bars 66. The rear tenons of the bars 66 are provided with opposite vertical flats 67 which with complementary sockets in the block 62 prevent twisting of the bars 66 relative to the block 62. The flats 67 of each bar 66 are transversely bored with a pair of axially spaced pin holes 68, one of which receives a retaining pin 69 through the block 62 so that the forward extension of each bar 66 from the block 62 can be altered for reasons to be described. The shanks 70 of the bars 60 just forward of the block 62 are necked down and extend through and slidably engage suitable lubricant seals and bushings 71 disposed in a nose block 72. The latter block is provided with a rectangular skirt plate 73 which together with the rear portion of the block 72 is removably inset into the face plate 33 and secured by screws 74 (see FIGS. 3 and 5). The draw bars 66 extend forwardly of the nose block 72 and the outer end portion 75 of each is further necked down and provided with two axially spaced pairs of opposite, vertically disposed retaining recesses 76. Flanking the nose block 72 two pairs of bolsters 77 surround the draw bars 66, being supported by rear tenons which screw into the front of the face and skirt plates 33 and 73. The outer ends of the bolsters 77 and the nose block 72 above and below the draw bar outer ends 75 are fitted with caps 78 having serrated faces all lying in a plane through the retaining recesses 76.

As is well known, a safe deposit box lock typically has two "big" noses, two "little" noses, or one "big" and one "little" nose, referring to their diameters. Hence, the nose holes 16 in the door blanks 15 also vary in diameter, and as shown in the drawings the spacing and the diameter of the draw bar outer ends 75 are such as to fittingly receive a door blank 15 whose nose holes 16 are sized to accommodate a lock having two "little" noses. In the event the nose holes 16 are sized for a lock having two "big" noses, or one "big" and one "little" nose, the bridge plate 63 is removed by the hand screws 64 and the link plates 60 disengaged from their hinge pins 52 and 61, thus providing access to the retaining pins 69. Either one or both pins 69 are removed, one or both draw bars 66 moved forwardly, and one or both retaining pins 69 replaced in the alternate pin holes 68, all depending upon the combination of "big" and "little" nose holes 16 in the blanks 15. The link plates 60, bridge plate 63 and hand screws 64 are then reassembled. All this results in the forward portions of the large diameter shank or shanks 70, as the case may be, of the draw bars 66 being exposed forward of the nose block 72, the diameters of the shanks 70 being sized to fit the larger nose holes 16. In any case, the door blank 15 is placed upon the draw bar ends 75 with its strike edge 17 uppermost and its rear face 18 outwardly. As mentioned, this occurs at station ST-SP of the turntable 10 before which time the cylinder 50 has been activated to rotate the bell crank 47 in the direction "B" indicated in FIG. 4, thus moving the link plates 60 and hence the draw block 62 and draw bars 66 outwardly of the nose block 72. To retain the door blank 15, a clamp block 80 is provided with a clamping face 81, which engages the door blank rear face 18, and two pairs of interior retaining lips 82.

In the arrangement shown in the drawings for the "little" nose holes 16, the retaining lips 82 interlock with the outer two pairs of retaining recesses 76 when the block 80 is slipped over the draw bar outer ends 75 and then lowered, the block 80 being appropriately relieved at 83 adjacent the retaining lips 82 for this purpose as well as to form the lips 82 themselves. When, on the other haand, one or both draw bars 66 have been moved forwardly to accommodate one or two "big" nose holes 16, the retaining lips 82 engage one or both of the inner two pairs of retaining recesses 76, as the case may be. In either event, as the turntable 11 thereafter rotates, the cylinder 50 is then activated in the reverse direction at the station CL, causing the draw bars 66 to retreat a predetermined amount within the nose block 72 and thus the clamp block 80 to push the door blank 15 tight against the serrated caps 78 where it is rigidly clamped therebetween during the subsequent tool operations at stations T1–T6. When the finished door 15 again arrives at station ST-SP, the draw bars 66, as previously mentioned, move outwardly, relieving the pressure on the door 15. The block 80 and the finished door 15 are then removed, a new unfinished blank 15 is put in place, and the operations repeated.

Figure 3:
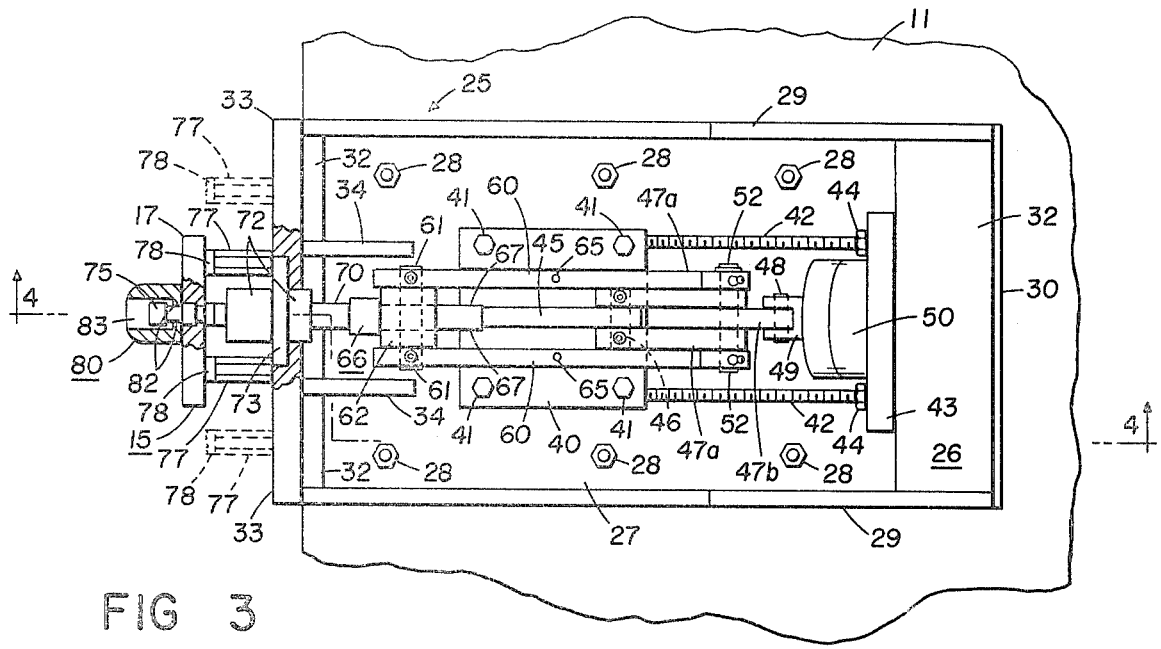
FIG. 3 is a top plan view of the interior of one of the workholders taken along the line 3—3 of FIG. 4, certain additional portions being sectioned to show their cooperative details.
Figure 4:
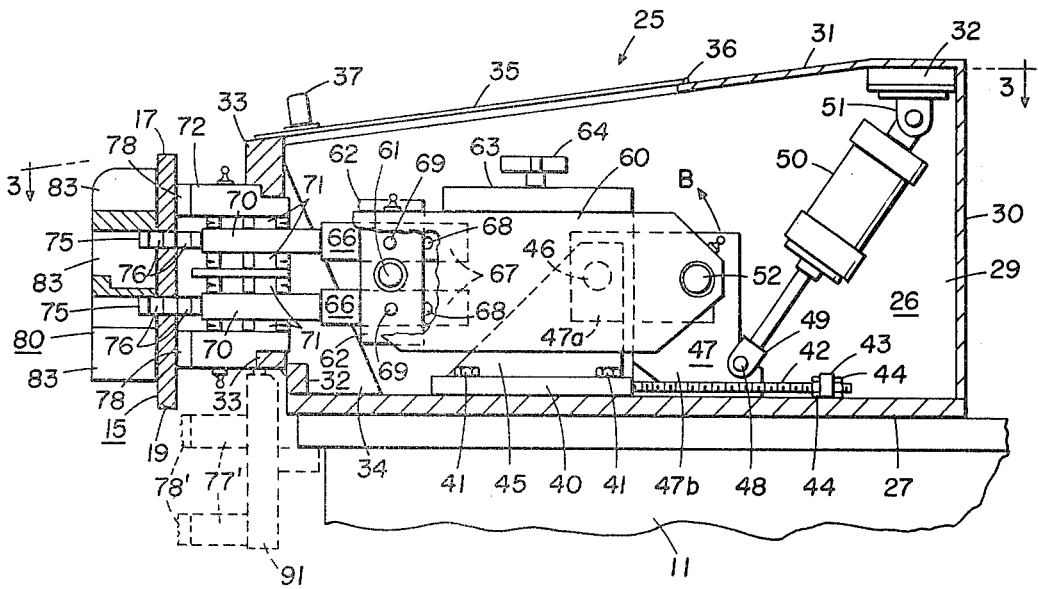
FIG. 4 is a side elevation of the interior of one of the workholders taken along the line 4—4 of FIG. 3.

In order to accommodate doors of greater heights, the bolsters 77 are removable and can be located at the other positions on the face plate 33 in holes 90 tapped into the plate 33 for this purpose, as indicated in FIGS. 3 and 5. To the same end, a lower extension 91 is attached below the nose block 72, as indicated in FIG. 4, the extension 90 carrying two pairs of bolsters 77' with similar serrated end caps 78' in order to support wider door blanks. In both cases, the clamp block 80 is replaced with a similar one having a more extensive clamping face 81. Should it be necessary to accommodate door blanks 15 whose nose holes 16, in order to accommodate various locks, have a different spacing from the strike edges 17, the nose block 72 can be removed (via the screws 74) and replaced with an alternate nose block either raising or lowering the draw bars 66 relative to the face plate 33. This is readily possible since the draw block 62 and bars 66 are in effect carried by the nose block 72 and can be raised or lowered owing to the articulation provided by the hinge pins 52 and 61 and the link bars 60.

Though the present invention has been described in terms of a particular embodiment, being the best mode known for carrying out the invention, it is not limited to that embodiment alone. Instead, the following claims are to be read as encompassing all adaptations and modifications of the invention falling within its spirit and scope.

I claim:

1. In the manufacture of doors for the compartments of safe deposit box nests from substantially uniformly oversized rectangular blanks of plate stock, each door in finished form having hinge, strike and side edges and front and rear faces with the rear face having provision for the mounting of a door lock thereon including a pair of spaced lock noses extending through the door from its rear to its front face, the improvement comprising: punching a pair of spaced lock nose holes through the door blanks uniformly located with respect to said edges; placing each door blank upon holding means, each holding means having a pair of parallel cantilevered draw members fittingly and slidably engageable with the door nose holes by sliding the door blank on the draw members through its nose holes so that the draw members extend axially therethrough in a forward direction from the front to the rear face of the door blank, whereby to support the door blank in a substantially vertical position, the draw members terminating in forward ends forwardly of the door rear face; engaging the forward ends of the draw members with removable clamp means carried by the draw members and defining a first clamping face engagable with the door rear face inboard of the door edges, the removable clamp means being thereupon effective to prevent withdrawal of the draw members axially from the nose holes in a rearward direction opposite said forward direction; moving the draw members and the removable clamp means in said rearward direction to cause the door front face to engage a second clamping face defined by portions of the holding means inboard of the door edges, whereby to clamp the door blank between said clamping faces; performing a plurality of door finishing operations upon the four edges and the rear face of the door blank by moving each holding means for same with the door blank in said clamped position from one to another of a succession of tool stations serially performing said operations upon the door blank; moving the draw members in said forward direction to unclamp the door blank after performance of said finishing operations thereof; and detaching the removable clamp means from and sliding the door blank off the draw members.

2. Manufacture according to claim 1 wherein a forward portion of each draw member of each holding means includes an inner shank and an outer shank of respectively greater and lesser cross-section in order to fittingly and slidably accommodate nose holes in the door blanks of respectively greater and lesser size, each draw member being selectively longitudinally adjustable relative to the other draw member of said holding means, whereby to permit selective engagement of both the draw members inner shanks or both the draw members outer shanks or one inner and one outer draw member shanks with respectively two greater sized nose holes or two lesser sized nose holes or one greater and one lesser sized nose holes of a door blank.

3. Manufacture according to claim 1 or 2 wherein a plurality of said holding means are disposed about the periphery of a rotatable, circular table and move therewith, each holding means being effective to hold one of the door blanks and being carried by the table in one direction from a position in which a door blank is placed upon the draw members of said holding means, then clamped thereon, then subjected to said finishing operations, then unclamped thereon, and then removed therefrom, all as aforesaid, during intermittent rotation of the table in said direction.

* * * * *